United States Patent
Tighe et al.

(10) Patent No.: US 7,682,720 B2
(45) Date of Patent: Mar. 23, 2010

(54) DIAGNOSTIC METHOD FOR DETECTING A COOLANT PUMP FAILURE IN A FUEL CELL SYSTEM BY TEMPERATURE MEASUREMENT

(75) Inventors: Thomas W Tighe, Bloomfield, NY (US); Glenn W. Skala, Churchville, NY (US)

(73) Assignee: GM Global Technology Operations, Inc., Detroit, MI (US)

(*) Notice: Subject to any disclaimer, the term of this patent is extended or adjusted under 35 U.S.C. 154(b) by 1175 days.

(21) Appl. No.: 11/266,606

(22) Filed: Nov. 3, 2005

(65) Prior Publication Data

US 2007/0065693 A1 Mar. 22, 2007

Related U.S. Application Data

(63) Continuation-in-part of application No. 11/228,914, filed on Sep. 16, 2005, now abandoned.

(51) Int. Cl.
 *H01M 8/04* (2006.01)
(52) U.S. Cl. .............................. 429/24; 429/26; 429/34
(58) Field of Classification Search ........................ None
 See application file for complete search history.

(56) References Cited

U.S. PATENT DOCUMENTS

2004/0033395 A1* 2/2004 Thompson .................. 429/13

FOREIGN PATENT DOCUMENTS

WO    WO 2005/008821 A2 *  1/2005

* cited by examiner

*Primary Examiner*—Jonathan Crepeau
*Assistant Examiner*—Tony Chuo
(74) *Attorney, Agent, or Firm*—John A. Miller; Miller IP Group, PLC

(57) ABSTRACT

A technique for determining whether a cooling fluid pump used for pumping a cooling fluid through a fuel cell stack has failed. The technique includes measuring the temperature of the cooling fluid at the output from the stack and/or measuring the cathode exhaust gas temperature as close as possible to the cathode outlet of the stack. The measured temperature is compared to a temperature that would be expected under the current operating conditions of the fuel cell system in a controller. If the difference between the measuring temperature and the expected temperature is large enough, then the controller provides a warning signal of pump failure, and also possibly reduces the stack outlet power.

23 Claims, 1 Drawing Sheet

DIAGNOSTIC METHOD FOR DETECTING A COOLANT PUMP FAILURE IN A FUEL CELL SYSTEM BY TEMPERATURE MEASUREMENT

CROSS-REFERENCE TO RELATED APPLICATIONS

This application is a continuation-in-part application of U.S. patent application Ser. No. 11/228,914, titled Diagnostic Method for Detecting a Coolant Pump Failure in a Fuel Cell System by Temperature Measurement, filed Sep. 16, 2005 now abandoned.

BACKGROUND OF THE INVENTION

1. Field of the Invention

This invention relates generally to a method for detecting cooling fluid pump failure in a fuel cell system and, more particularly, to a method for detecting cooling fluid pump failure in a fuel cell system that includes measuring one or both of the temperature of the cooling fluid at the outlet from the fuel cell stack and the temperature of the cathode exhaust at the outlet from the fuel cell stack, and comparing the measured temperature to a temperature that would be expected based on the operating conditions of the fuel cell system to determine whether the cooling fluid is flowing through the stack.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For the automotive fuel cell stack mentioned above, the stack may include about two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of flow field or bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. The bipolar plates also include flow channels through which a cooling fluid flows.

The cooling fluid is pumped through the cooling fluid flow channels in the stack by a pump to maintain the stack at a desirable operating temperature, such as 60°-80° C., for efficient stack operations. However, if the cooling fluid pump fails, then the stack may overheat depending on the output load of the stack, possibly damaging the fuel cell components, such as the membranes. Therefore, it is necessary to monitor whether the cooling fluid pump is pumping the cooling fluid through the cooling fluid flow channels to prevent fuel cell stack failure.

One known technique for determining if the cooling fluid pump is operating is to provide a flow sensor at a suitable location in the cooling fluid flow line outside of the fuel cell stack to measure the flow rate of the cooling fluid. However, such flow sensors are typically expensive devices that add significant cost to the fuel cell system. It would be desirable to eliminate the flow sensor in the fuel cell system used for this purpose.

SUMMARY OF THE INVENTION

In accordance with the teachings of the present invention, a technique for determining whether a cooling fluid pump used for pumping a cooling fluid through a fuel cell stack has failed. The technique includes measuring the temperature of the cooling fluid at the output from the stack and/or measuring the cathode exhaust gas temperature as close as possible to the cathode outlet of the stack. The measured temperature is compared to a stack temperature that would be expected under the current operating conditions of the fuel cell system. If the difference between the measured temperature and the expected temperature is large enough, then the controller provides a warning signal of pump failure, and also possibly reduces the stack outlet power.

Additional features of the present invention will become apparent from the following description and appended claims, taken in conjunction with the accompanying drawings.

DETAILED DESCRIPTION OF THE EMBODIMENTS

Figure 1:
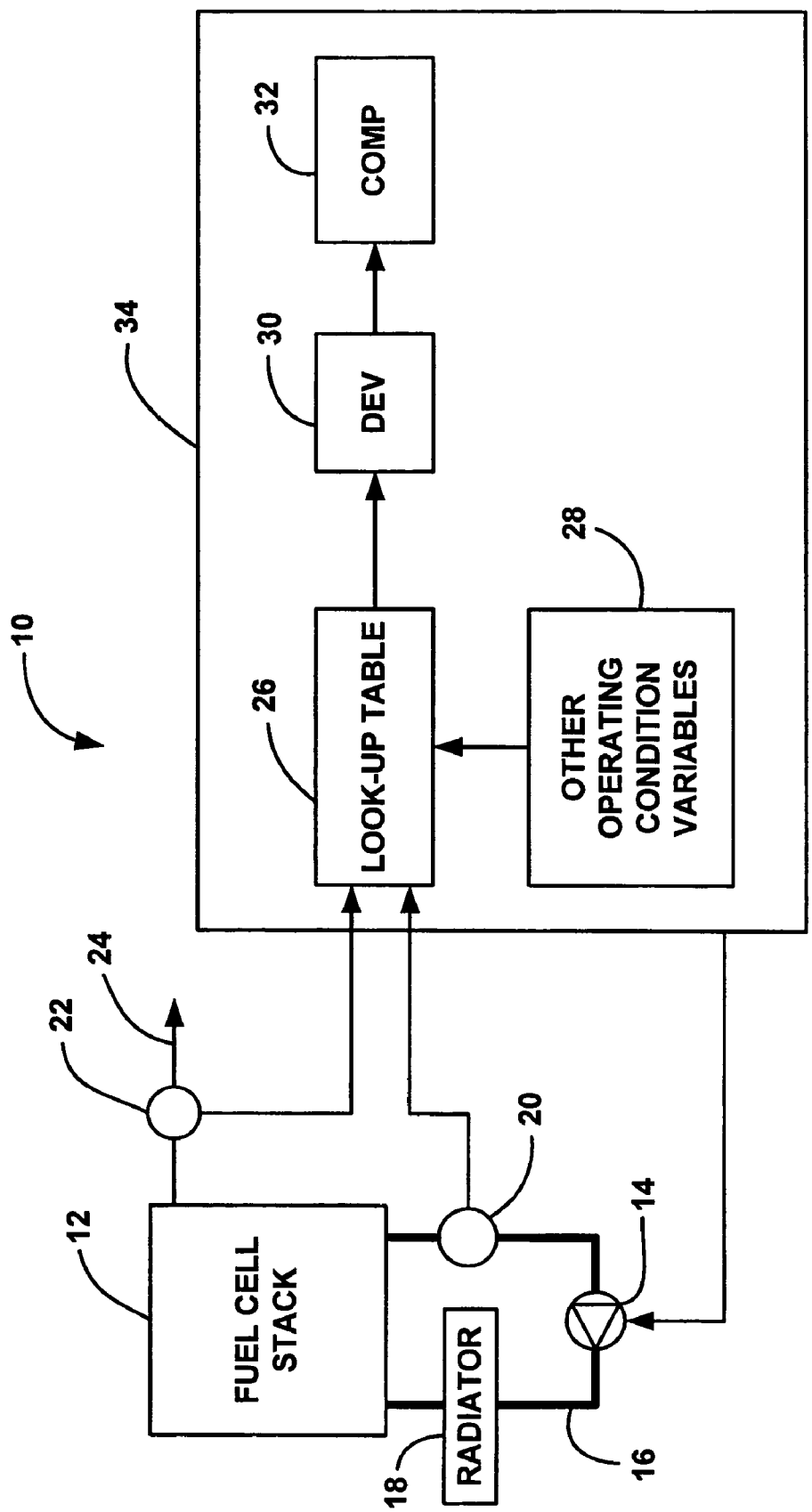
FIG. 1 is a block diagram of a fuel cell system that uses temperature sensors for determining whether a cooling fluid pump has failed, according to an embodiment of the present invention.

The following discussion of the embodiments of the invention directed to a technique for determining whether a cooling fluid pump has failed in a fuel cell system is merely exemplary in nature, and is in no way intended to limit the invention or its applications or uses.

FIG. 1 is a block diagram of a fuel cell system 10 including a fuel cell stack 12. A cooling fluid pump 14 pumps a cooling fluid through a pipe 16 external to the stack 12 and through cooling fluid flow channels between the several fuel cells in the stack 12, as is well understood in the art. The cooling fluid is also pumped through a radiator 18 external to the stack 12 to dissipate heat from the cooling fluid before it is returned to the stack 12. A fan (not shown) could also be provided to force air through the radiator 18 to remove the waste heat. The speed of the pump 14 and the speed of the fan provide the desired cooling and are determined from the output load of the stack 12 and other operating conditions by a controller 34 so that the temperature of the stack 12 is maintained at a desirable operating temperature for efficient stack operation.

In the embodiment shown in figure, the stack 12, the radiator 18 and the pump 14 are shown in a particular configuration or sequence. However, the order of the stack 12, the pump 14 and the radiator 18 in the coolant loop can be different in other embodiments. Also, the coolant loop can include by-pass paths for providing the cooling fluid to other devices, as is well understood in the art.

According to the invention, a temperature sensor 20 is positioned in the line 16 as close as possible to the outlet from the fuel cell stack 12. Additionally, a temperature sensor 22 is positioned in a cathode exhaust line 24, also as close as possible to the stack 12. Although two temperature sensors 20 and 22 are used in the system 10, it is within the scope of the present invention that only one of the temperature sensors 20 or 22 be used to determine if the pump 14 has failed. The temperature sensors 20 and 22 could also be positioned within the stack 12, where the sensor 20 measures the temperature of the cooling fluid and the sensor 22 measures the temperature of the cathode exhaust. For example, the sensor 20 could be positioned within the cooling fluid outlet header and the sensor 22 could be positioned within the cathode exhaust outlet header.

The temperature sensor 20 measures the temperature of the cooling fluid exiting the stack 12 and provides a signal indicative of same to a look-up table 26 within the controller 34. Likewise, the temperature sensor 22 measures the temperature of the cathode exhaust in the exhaust line 24 and provides a temperature signal indicative of same to the look-up table 26. The look-up table 26 also receives signals from a subsystem 28 identifying the current operating conditions of the fuel cell system 10, such as ambient temperature, output load of the stack 12, stack start-up, etc.

The look-up table 26 determines what the temperature of the cooling fluid and/or the cathode exhaust gas should be based on the current operating conditions of the fuel cell system 10 and outputs the temperature signals to a deviation device 30 to determine the difference between the two temperature signals for the cathode exhaust and/or the two temperature signals for the cooling fluid. Particularly, the look-up table 26 provides the measured temperature signal of the cathode exhaust and the expected temperature of the cathode exhaust if the system 10 only uses the temperature sensor 22 to determine if the pump 14 has failed. Or, the look-up table 26 provides the measured temperature signal of the cooling fluid and the expected temperature of the cooling fluid if the system 10 only uses the temperature sensor 20 to determine if the pump 14 has failed. Both sensors 20 and 22 can be used, where the look-up table 26 would send the four temperature signals to the deviation device 30.

The difference between the two temperature signals is then applied to a comparison device 32 that compares the difference to a predetermined value. If the difference between the measured temperature from either of the temperature sensors 20 and 22 and the calculated temperature is greater than the predetermined value, it is an indication that the cooling fluid is not cooling the stack 12. Therefore, the pump 14 has either completely failed or partially failed and is not providing the desired cooling.

As mentioned above, one of the operating conditions applied to the look-up table 26 from the sub-system 28 could be whether the stack 12 is at start-up. In some applications, such as cold starts, it may be desirable to delay the start of the pump 16 at system stack start-up to reduce the thermal mass of the system so that it heats up to the operating temperature faster. If the pump 14 is not immediately started at stack start-up, then the temperature signal provided by the sensors 20 and 22 will be lower than if the pump 14 is immediately started at stack start-up. Thus, the look-up table 26 needs to adjust the expected temperature if the start of the pump 14 is delayed at system start-up. Also, once the pump 16 is started, the temperature increase may be slower than expected for a certain period of time. A logic step may be required to determine if the pump 16 has recently been started to adjust for the expected temperature in the look-up table 26 until the temperature reaches a steady-state. Therefore, the logic in the look-up table 26 may need to calibrated for cold starts in this manner.

It is desirable that the sensors 20 and 22 be positioned as close as possible to the active area of the fuel cell stack 12, possibly within the stack 12 itself, so that they respond quickly enough to a rise in temperature. As discussed above, either of the temperature sensors 20 or 22 can be used to determine if the pump 14 has failed. The sensor 22 may provide a better indication of the stack temperature because if the cooling fluid is not flowing, then the temperature of the cooling fluid within the stack 12 may increase significantly before the temperature of the cooling fluid outside of the stack 12 where the sensor 20 is located increases significantly. However, if there are water droplets in the cathode exhaust gas, water on the sensor 22 could provide evaporative cooling, possibly giving an inaccurate temperature reading.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope-of the invention as defined in the following claims.

What is claimed is:

1. A fuel cell system comprising:
   a fuel cell stack;
   a cooling fluid pump for pumping a cooling fluid through a cooling fluid loop and the stack;
   a temperature sensor for measuring the temperature of the cooling fluid in the cooling fluid loop; and
   a controller responsive to an actual temperature signal from the temperature sensor indicative of the temperature of the cooling fluid in the cooling fluid loop, said controller comparing the actual temperature signal to an expected temperature signal based on current operating conditions of the fuel cell system including ambient air temperature and output load of the stack to determine whether the cooling fluid pump has failed.

2. The fuel cell system according to claim 1 wherein the temperature sensor is positioned as close as possible to a cooling fluid outlet from the fuel cell stack.

3. The fuel cell system according to claim 1 wherein the temperature sensor is positioned within a cooling fluid outlet header of the stack.

4. The fuel cell system according to claim 1 wherein the controller determines whether a difference between the actual temperature signal and the expected temperature signal is greater than a predetermined value to determine whether the cooling fluid pump has failed.

5. The fuel cell system according to claim 1 wherein the controller adjusts the expected temperature if the start of the pump is delayed at fuel cell system start-up.

6. The fuel cell system according to claim 1 wherein the system is on a vehicle.

7. A fuel cell system comprising:
a fuel cell stack;
a cooling fluid pump for pumping a cooling fluid through a coolant loop and the stack;
a temperature sensor for measuring the temperature of a cathode exhaust of the stack; and
a controller responsive to an actual temperature signal from the temperature sensor indicative of the temperature of the cathode exhaust, said controller comparing the actual temperature signal to an expected temperature signal based on current operating conditions of the fuel cell system including ambient air temperature and output load of the stack to determine whether the cooling fluid pump has failed.

8. The fuel cell system according to claim 7 wherein the temperature sensor is positioned within the fuel cell stack.

9. The fuel cell system according to claim 7 wherein the temperature sensor is positioned in a cathode exhaust line as close as possible to an outlet of the fuel cell stack.

10. The fuel cell system according to claim 7 wherein the controller determines whether a difference between the actual temperature signal and the expected temperature signal is greater than a predetermined value to determine whether the cooling fluid pump has failed.

11. The fuel cell system according to claim 7 wherein the controller adjusts the expected temperature if the start of the pump is delayed at fuel cell system start-up.

12. The fuel cell system according to claim 7 wherein the system is on a vehicle.

13. A fuel cell system comprising:
a fuel cell stack;
a cooling fluid pump for pumping a cooling fluid through the stack;
a temperature sensor for measuring a temperature at a certain location within the fuel cell system; and
a controller responsive to an actual temperature signal from the temperature sensor, said controller comparing the actual temperature signal to an expected temperature signal based on current operating conditions on the fuel cell system including ambient air temperature and output load of the stack to determine whether the cooling fluid pump has failed.

14. The fuel cell system according to claim 13 wherein the temperature sensor is a cooling fluid temperature sensor for measuring the temperature of the cooling fluid flowing from the stack.

15. The fuel cell system according to claim 13 wherein the temperature sensor is a cathode exhaust temperature sensor for measuring the temperature of a cathode exhaust from the fuel cell stack.

16. The fuel cell system according to claim 13 wherein the controller adjusts the expected temperature if the start of the pump is delayed at fuel cell system start-up.

17. A fuel cell system comprising:
a fuel cell stack;
a cooling fluid pump for pumping a cooling fluid through a cooling fluid loop and the stack;
a cooling fluid temperature sensor for measuring the temperature of the cooling fluid in the cooling fluid loop;
a cathode exhaust gas temperature sensor for measuring the temperature of a cathode exhaust gas from the fuel cell stack; and
a controller responsive to a cooling fluid temperature signal from the cooling fluid temperature sensor indicative of the temperature of the cooling fluid in the cooling fluid loop and responsive to a cathode exhaust temperature signal from the cathode exhaust temperature sensor indicative of the temperature of the cathode exhaust, said controller comparing the cooling fluid temperature signal and the cathode exhaust temperature signal to an expected temperature signal based on current operating conditions in the fuel cell system including ambient air temperature and output load of the stack to determine whether the cooling fluid pump has failed.

18. The fuel cell system according to claim 17 wherein the cooling fluid temperature sensor is positioned as close as possible to a cooling fluid outlet from the fuel cell stack.

19. The fuel cell system according to claim 17 wherein the cooling fluid temperature sensor is positioned within a cooling fluid outlet header of the stack.

20. The fuel cell system according to claim 17 wherein the cathode exhaust gas temperature sensor is positioned within the fuel cell stack.

21. The fuel cell system according to claim 17 wherein the cathode exhaust gas temperature sensor is positioned in a cathode exhaust line as close as possible to an outlet of the fuel cell stack.

22. The fuel cell system according to claim 17 wherein the controller determines whether a difference between the actual temperature signal and the expected temperature signal is greater than a predetermined value to determine whether the cooling fluid pump has failed.

23. The fuel cell system according to claim 17 wherein the controller adjusts the expected temperature if the start of the pump is delayed at fuel cell system start-up.

* * * * *